July 16, 1935. W. J. DE WITT 2,008,437
FISH LURE
Filed Oct. 30, 1934 2 Sheets-Sheet 1
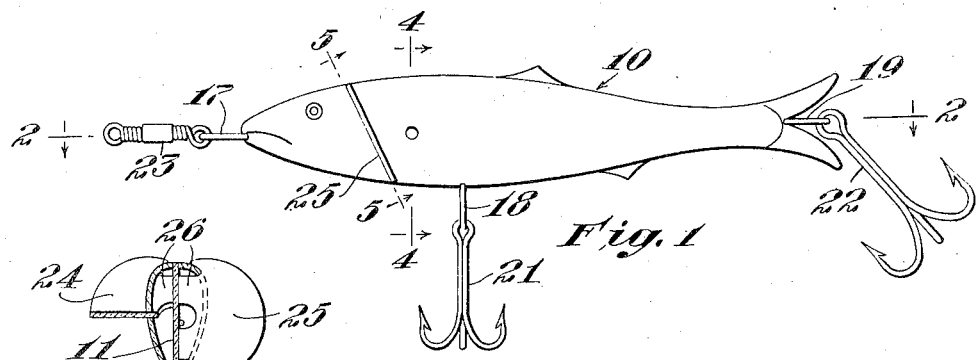
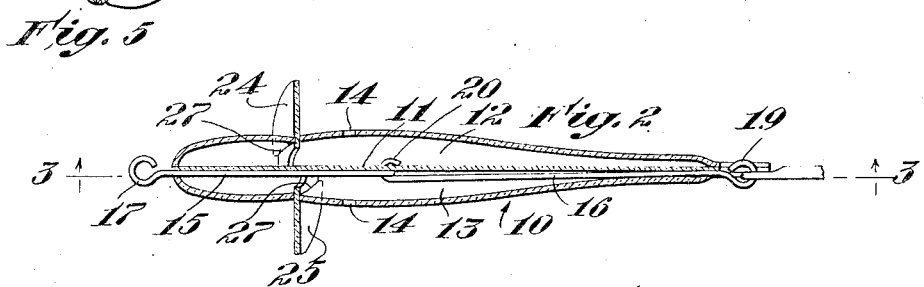
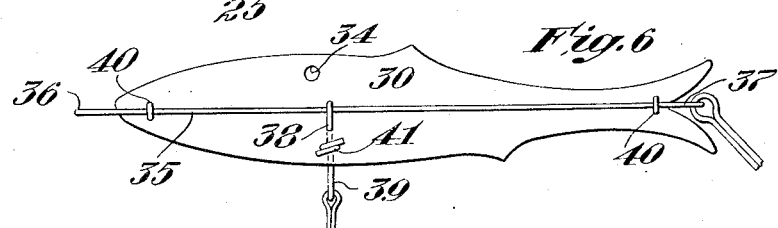
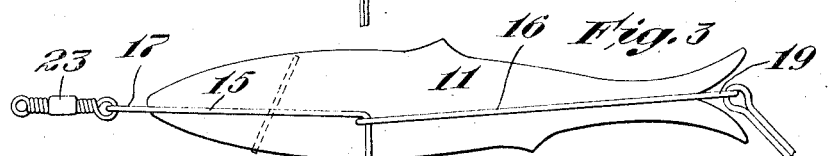
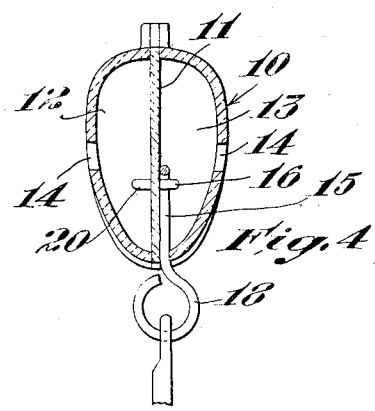
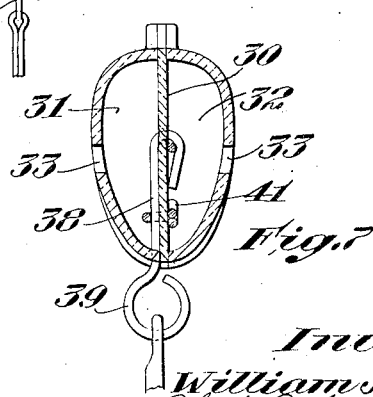
Inventor
William J. DeWitt
by Roberts, Cushman and Woodberry
attys.

July 16, 1935. W. J. DE WITT 2,008,437
FISH LURE
Filed Oct. 30, 1934 2 Sheets-Sheet 2

Inventor
William J. DeWitt
by Roberts, Cushman & Woodberry
Attys.

Patented July 16, 1935

2,008,437

UNITED STATES PATENT OFFICE 2,008,437

FISH LURE

William J. De Witt, Auburn, N. Y., assignor to Shoe Form Co., Inc., Auburn, N. Y., a corporation of New York Application October 30, 1934, Serial No. 750,660

6 Claims. (Cl. 43—46)

This invention relates to an improvement in a fish lure and more particularly to a lure which embodies a hollow body and may have the semblance or appearance of a minnow or other small fish and is a continuation in part of my copending application Serial No. 686,548, filed August 24, 1933.

The primary object of this invention is to provide a fish lure, including a hollow body, divided by a partition into two compartments and having openings leading through the walls thereof into one or both such compartments whereby the lure may be loaded with water, small shot or the like to facilitate the casting of the lure.

Another object of this invention is to provide in the partition of the lure openings connecting the two compartments through which water and air may flow to equalize the condition in the compartments and to keep the lure with the top fin upward.

A further object of this invention is to provide, embodied in such lure, a frame to which is secured the lead line and hooks whereby any drag or impulse exerted upon the hooks by a fish is transmitted directly to the line.

These and other objects will appear from a consideration of the following description and of the drawings which form a part thereof and in which Fig. 1 is a side elevation of a fish lure embodying one form of this invention;

Fig. 2 is a central longitudinal section thereof taken along the line 2—2 of Fig. 1;

Fig. 3 is a longitudinal sectional view taken along the line 3—3 of Fig. 2;

Figure 8:
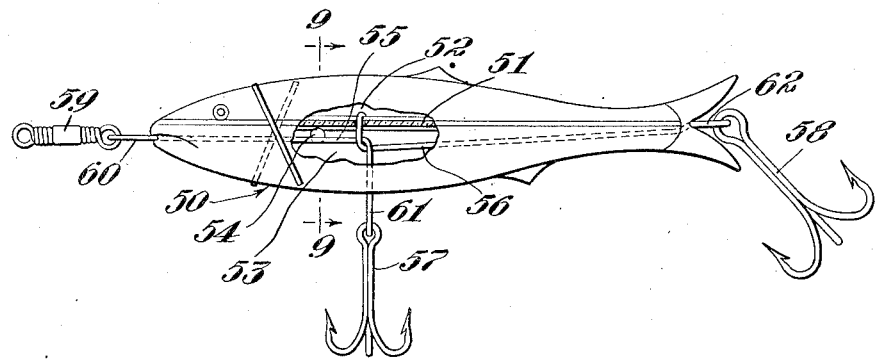
Figure 9:
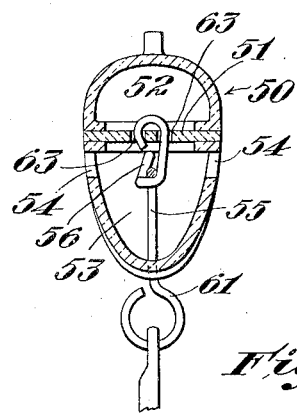
Figure 10:
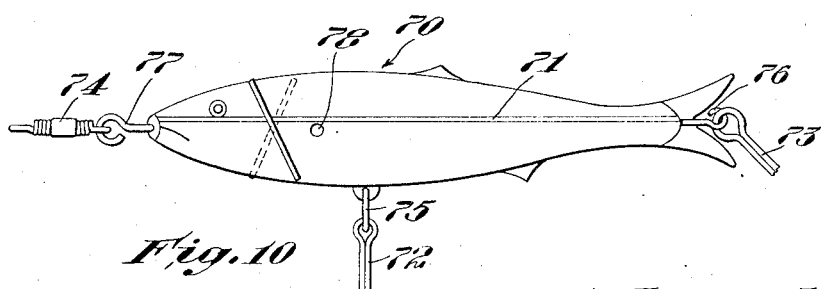

Figs. 4 and 5 are cross sectional views taken along the lines 4—4 and 5—5 respectively of Fig. 1;

Fig. 6 is a longitudinal sectional view similar to Fig. 3 of a fish lure embodying another form of this invention;

Fig. 7 is a cross sectional view similar to Fig. 4 of the form shown in Fig. 6;

Fig. 8 is a side elevation with parts broken away of a fish lure embodying another form of this invention;

Fig. 9 is an enlarged cross section thereof taken along the line 9—9 of Fig. 8; and Fig. 10 is a side elevation of a fish lure embodying still another form of this invention.

The lure 10 shown in Figs. 1 to 5 inclusive, is in the form of a minnow having a hollow body made from celluloid or other light workable material. The body of the minnow is divided by a vertical partition 11 into two separate compartments 12 and 13 into each of which openings 14 through the side walls lead. Supported by the partition 11 is a frame comprising two connected wires 15 and 16. The wire 15 is substantially right angular in form terminating at the mouth of the minnow in a loop 17 and at the belly of the minnow in a loop 18. One end of the wire 16 terminates in a loop 19 at the tail of the minnow while the other end terminates in a loop 20 which passes through the angle of the wire 15 and a hole in the partition 11. The loop 20 thus acts to position both the wire 15 and the wire 16.

In making the minnow the wires 15 and 16 are first assembled with the partition in the position shown in the drawings and the side walls which have been separately molded or stamped are secured thereto in any suitable manner. The ends of the wires leading to the loops 17, 18 and 19 pass between the partition and one of the side walls and such openings are sealed either by suitably shaping portions of the wall or by the use of a suitable filler cement or by both so that no water can enter therethrough into the interior of the minnow. As pointed out above the walls of the minnow are preferably made of celluloid and as is well known the portions of the wires passing between the partition and one wall can easily be imbedded in the edge of the wall. However the celluloid forming the walls may be suitably colored evenly throughout its thickness so that its appearance will not be materially impaired by usage. Also the celluloid may be translucent or transparent to disclose any coloring applied to the partition.

Hooks 21 and 22 are secured to the loops 18 and 19 and a swivel 23 is secured to the loop 17 in any well known manner. When either of the hooks 21 or 22 is taken by a fish the drag is transmitted directly to the leader (not shown) attached to the swivel 23 without exerting any strain upon the minnow. At the sides of the head are fins 24 and 25, each of which includes one or more tongues 26 inserted through slots 27 and bearing against the partition 11 (see Fig. 5). The positions of the fins determine the action of the minnow when dragged through the water. When positioned as here shown the minnow revolves but if the inclination of the slots 27 be changed so that both fins are inclined as the fin 24 is inclined the minnow will tend to dive or if both fins are inclined as the fin 25 is inclined the minnow will ride on the surface of the water.

In order to increase the weight of the minnow for casting, water may be introduced through the openings 14. Such openings are, as shown, relatively small and located at the head of the minnow so that the centrifugal force set up when the minnow is cast will shift the water toward the tail of the minnow and since the minnow is otherwise sealed practically none will escape. If desired small shot may be introduced through the openings. The openings may be sealed by corks or otherwise to prevent the escape of any water or shot as the minnow is handled.

Figs. 6 and 7 illustrate a modification of the lure 10 which resides in the form of the partition and the manner of securing the hook carrying frame thereto. The partition 30, like the partition 11, is vertical and divides the body of the minnow into two compartments 31 and 32 into each of which openings 33 through the side walls lead. An opening 34 in the partition 30 connects the compartments so that when the minnow before casting is suspended vertically should the compartments be unequally filled with water the excess in one compartment will flow through the opening 34. A further purpose of this invention is, when the minnow is traveling practically parallel with the surface of the water to permit an equalization of the air displaced by the water in the compartments so that an air bubble will form at the top of the minnow and the minnow will be kept with the top fin upward.

The frame in this form comprises a wire 35 terminating at the mouth of the minnow in a loop 36 which receives the lead swivel and at the tail of the minnow in a loop 37 to which a hook is secured, and a wire 38 terminating at the belly of the minnow in a loop 39 adapted to receive a hook. The wire 35 is secured to the partition near the ends thereof by loops 40. The inner end of the wire 38 is passed through the partition 30 and bent down to secure the wire 35 to the partition. A loop 41 further secures the wire 38 to the partition.

The pull of a fish taking the hook at the tail of the minnow is directly transmitted through the wire 35 to the lead. The pull of a fish taking the hook at the belly of the minnow is resisted by the partition 30 and also by the wire 35 being transmitted thereby to the lead swivel.

The lure 50 shown in Figs. 8 and 9 is also in the form of a minnow made from celluloid or other light workable material comprising a hollow body divided by a horizontal partition 51 into two compartments 52 and 53. In the walls of the minnow are provided holes 54 which lead to the lower compartment 53 and by which water, shot or the like may be introduced to increase the weight of the minnow. The upper compartment 52 is substantially sealed so that no water can enter from without, to ensure that the minnow will take an upright position in the water no matter how it be cast or dropped.

Mounted within the compartment 53 and supported by the partition 51 is a frame comprising two connected wires 55 and 56, to which hooks 57 and 58 and a swivel 59 are attached. The wire 55 is substantially right angular in form terminating at the mouth in a loop 60 to which the swivel 59 is secured and at the belly in a loop 61 to which the hook 57 is attached. The wire 56 terminates at one end at the tail in a loop 62 to which the hook 58 is attached and the other end is bent around the wire 55 and passed through openings 63 in the partition. The openings in the walls through which the ends of the wires pass are preferably sealed as pointed out above in the description of the form shown in Figs. 1 to 5. The joinder of the wire 56 to the partition 51 positions both wires so that the drag when either hook is taken by a fish is transmitted directly to the lead line (not shown) attached to the swivel 59. The openings 63 may be closed in any suitable manner so that the compartment 52 will be air tight. It is preferred, however, that the openings be left open so that the air displaced by the introduction of water into compartment 53 may form a bubble in the compartment 52.

The lure 70 shown in Fig. 10 is also hollow, the interior of which is divided horizontally by a partition 71 similar to the lure 50. The hooks 72 and 73 and the swivel 74 are attached to loops 75, 76 and 77 respectively, which are secured directly to the body of the lure and are not parts of a wire frame as in the other forms here shown. The partition divides the lure into two compartments to the lower of which openings 78 lead.

While several embodiments of this invention have been shown and described it will be understood that I am not limited thereto and that other embodiments may be made without departing from the spirit and scope of this invention as set forth in the following claims.

I claim:

1. A fish lure comprising a hollow body resembling a minnow or other small fish, a partition dividing the interior of the body into two compartments, and a frame including wires providing a loop at the mouth of the lure for receiving a lead and loops at the belly and tail of the lure for receiving hooks, said wires being secured to said partition whereby the strain set up by the catching of fish is resisted by said partition and transmitted thereby to the lead.

2. A fish lure comprising a hollow body resembling a minnow or other small fish, a partition dividing the interior of the body into two compartments, and a frame including wires providing a loop at the mouth of the lure for receiving a lead and loops at the belly and tail of the lure for receiving hooks, said wires being secured to said partition, the wire providing the lead loop also providing one of the hook loops whereby the strain set up by the catching of a fish upon the hook secured to said loop is transmitted directly by said wire to the lead.

3. A fish lure comprising a hollow body resembling a minnow or other small fish, a partition dividing the interior of the body into two compartments and a frame including a wire providing at one end a lead loop and at the other end a hook loop and a second wire providing at one end a hook loop, the other end of the second wire being bent to secure it and the first wire to the partition whereby the strain set up by a caught fish is resisted by said partition and transmitted thereby to the lead.

4. A fish lure comprising a hollow body resembling a minnow or other small fish, a partition dividing the interior of the body into two compartments and a frame fixed to said partition, said frame comprising a wire bent substantially at right angles, the ends of which project from the body one at the head and the other at the belly, and a second wire one end of which projects from the body at the tail and the other end of which passes through the angle of the first wire and secures said first wire to the partition.

5. A fish lure comprising a hollow body resembling a minnow or other small fish and a partition dividing the interior of the body into two compartments the side walls of the body being provided with openings through which water may be introduced into the compartments and said partition being provided with an opening connecting the compartments and by which the amount of water in the compartments may be equalized and the air displaced in the compartments by the water is joined into a bubble at the top of the body.

6. A fish lure including a hollow body, a horizontal partition dividing the interior of the body into upper and lower compartments and openings in the side walls leading to the lower compartment whereby that compartment only may be loaded the upper compartment being substantially air tight, and a hook secured to the partition and extending through the lower compartment.

WILLIAM J. DE WITT.